US008703087B2

(12) United States Patent
Lord

(10) Patent No.: US 8,703,087 B2
(45) Date of Patent: Apr. 22, 2014

(54) APPARATUS AND METHOD FOR TOP REMOVAL OF GRANULAR MATERIAL FROM A FLUIDIZED BED DEPOSITION REACTOR

(75) Inventor: Stephen Michael Lord, Encinitas, CA (US)

(73) Assignee: Lord Ltd., LP, San Diego, CA (US)

( * ) Notice: Subject to any disclaimer, the term of this patent is extended or adjusted under 35 U.S.C. 154(b) by 1153 days.

(21) Appl. No.: 12/647,283

(22) Filed: Dec. 24, 2009

(65) Prior Publication Data

US 2010/0098850 A1    Apr. 22, 2010

Related U.S. Application Data

(63) Continuation-in-part of application No. 11/810,422, filed on Jun. 4, 2007, now abandoned.

(51) Int. Cl.
*C01B 33/02* (2006.01)
*C01B 33/027* (2006.01)
*C01B 33/035* (2006.01)
*B01J 8/18* (2006.01)

(52) U.S. Cl.
USPC ............................................ 423/349; 427/213

(58) Field of Classification Search
CPC .... C01B 33/02; C01B 33/027; C01B 33/035; B01J 8/18; B01J 8/0055
USPC .............. 422/139; 241/68; 427/213; 423/349
See application file for complete search history.

(56) References Cited

U.S. PATENT DOCUMENTS 3,012,861 A  *  12/1961  Ling ............................ 423/349
4,642,227 A       2/1987  Flagan et al.

(Continued)

FOREIGN PATENT DOCUMENTS

CN     1103479      6/1995
DE    10260733      7/2004
JP   2005147586     6/2005

OTHER PUBLICATIONS

Supplementary European Search Report of European Patent Application No. EP08780156.9 mailed Sep. 6, 2012.

(Continued)

*Primary Examiner* — Walter D Griffin
*Assistant Examiner* — Huy-Tram Nguyen

(57) ABSTRACT

A method of operating a fluidized bed deposition reactor to provide top removal of granular material, including production product is set forth. The vertical generally cylindrical reactor has at least one gas inlet at the lower end, at least one gas and solids outlet at the upper end and a gas/granular product separator connected to the gas and solids outlet. A heated reaction zone located in the lower portion of the reactor includes a fluidized bed; the bed being fluidized to establish a bubbling fluidized bed with a defined stable height. A disengaging space is provided above the stable bed height. A reaction gas is added to the bottom of the reactor, the reaction gas depositing a reaction product coating on the granular particles, the coating being abraded off the granules. The combined flow rate of the fluidizing gas and the reaction gas is adjusted so that a majority of the granular particles are retained in the reactor while maintaining bubbling. The height of the bed is increased and the disengaging height above the bed is decreased until the bursting of bubbles near the surface of the bed throws granular particles through the gas and solids outlet to the gas/granular product separator. The flow rates of the gases are controlled to maintain a balance between particles removed by the separator and the average rate of granular particle size increase as adjusted for attrition.

5 Claims, 5 Drawing Sheets

(56) References Cited

U.S. PATENT DOCUMENTS

| | | | |
|---|---|---|---|
| 5,339,774 A | 8/1994 | Tang | |
| 5,560,762 A * | 10/1996 | Bresser et al. | 75/447 |
| 5,798,137 A | 8/1998 | Lord | |
| 5,876,793 A | 3/1999 | Sherman et al. | |
| 6,451,277 B1 | 9/2002 | Lord | |
| 6,827,786 B2 | 12/2004 | Lord | |
| 7,490,785 B2 | 2/2009 | Weidhaus | |
| 2004/0151652 A1 | 8/2004 | Herold | |
| 2007/0040056 A1 | 2/2007 | Weidhaus | |

OTHER PUBLICATIONS

A.M. Beers et al., "CVD Silicon Structures Formed by Amphorous and Crystalline Growth," Journal of Crystal Growth, 1983. p. 64, North-Holland Publishing Company.

Office Action for counterpart Chinese Patent Application No. 200880018753.8.

\* cited by examiner

APPARATUS AND METHOD FOR TOP REMOVAL OF GRANULAR MATERIAL FROM A FLUIDIZED BED DEPOSITION REACTOR

This is a continuation-in-part of U.S. application Ser. No. 11/810,422, filed Jun. 4, 2007, now abandoned.

BACKGROUND OF THE INVENTION

This invention relates generally to the field of deposition reactors and more specifically to an apparatus and method for top removal of granular material from a fluidized bed deposition reactor.

Fluidized bed reactors utilize a bed usually comprising a finely divided valuable catalyst which makes it important to design the reactors to prevent catalyst losses. As a result the practice was developed of requiring a large disengaging height above the bed surface and of using cyclones to capture the fine dust that may leave the reactor and then to return it to the bed. A concept referred to as the total disengaging height, (TDH) was developed to estimate the height required for all the particles that would settle out by gravity to settled out. Internal cyclones were provided at this height to capture the finer dust and return it to the bed. Whenever it is desirable to remove the catalyst from the bed the preferred procedure was to remove it from the bottom of the reactor by gravity. Other types of reactors called dilute phase or transport reactors entrained all the solids up through the reactor and out the top, but these reactors did not have a recognizable bed. When these gas-solids reactor concepts are applied to the design of deposition reactors, where gases are introduced to make the bed of particles expand, the dilute phase reactor had a major problem of producing primarily a fine dust which was undesirable. As a result, the majority of deposition reactors have been fluidized beds with a large disengaging height and bottom solids outlets. Internal cyclones have seldom been used because of particle deposition on the outside of the cyclones and the problems of reintroducing particles without plugging the cyclone outlets. Since some fine dust is always produced, most deposition reactors have external cyclones or filters to trap the dust and prevent damage to the equipment used to recover the effluent gases. Thus, the historic approach has been to remove the product from the bottom, provide a large disengaging height to minimize product loss, and use external dust removal.

In 1973, Professor D. Geldart proposed the grouping of powders in to four groups, designated as "Geldart Groups". The groups are defined by their locations on a diagram of solid-fluid density difference and particle size (see FIG. 5). Fluidized beds are designed based upon the particle's defined by Geldart grouping, which are as follows.

Group A particle size is between 20 and 100 um, and the particle density is typically 1400 kg/m$^3$. Beds from Group A particles will expand by a factor of 2 to 3 at incipient fluidization, due to a low bulk density prior to the initiation of a bubbling bed phase. Most powder-catalyzed beds utilize Group A.

Group B particle size lies between 40 and 500 um and the particles have a density between 1400 and 4500 kg/m$^3$. Bubbling typically occurs at incipient fluidization.

Group C contains extremely fine particles (20 to 30 um) providing the most cohesive particles. These particles fluidize under very difficult to achieve conditions, and may require the application of an external force, such as mechanical agitation.

Group D particles are above 600 um in size and typically have high particle densities. Because of the large particle sizes, fluidization of this group requires very high fluid energies typically associated with high levels of abrasion between bed particles. They are usually used in shallow beds or in a spouting mode.

A primary use for deposition reactors is to produce high purity silicon. Lord in U.S. Pat. No. 6,451,277 describes, and shows in FIG. 1b, a bed heating method which removes beads from near the top of the bed and then heats them and returns them to the bed. The product 3, is removed from the bottom of the reactor. This bed heating method is rejected in the '277 patent in favor of a preferred option where the beads are removed by gravity from the bottom then reheated and returned to the bed in a pulsed mode. Lord U.S. Pat. No. 6,827,786 provides a detailed description of a multistage deposition reactor which takes advantage of increased bed height to produce additional silicon by use of additional gas injection points along the side of the reactor. In this design the seed generation by grinding is spread out along the reactor because of the extra nozzles and some deposition occurs further from the inlet, but most of the grinding and deposition occurs in the bottom where the solid product is removed. The Lord '786 patent discusses, at Col 3, line 25, the "De Beers" paper which showed the need for some residence time and temperature to fully crystallize the product and dehydrogenate the beads. This is accomplished in the pulsed bead heater at high temperature and with short residence time. The Lord patents and the many references cited do not discuss energy recovery from the effluent gas. However, U.S. Pat. Nos. 5,798,137 and 6,451,277 discusses the use of the heat from the outgoing product to heat the incoming gas.

The primary deficiency of the prior technology is utilizing a fluid bed design with a bottom outlet and large disengaging space and accepting the inherent conflicting demands caused by introducing the cold deposition gas, which also provides the bulk of the seed generation by grinding, at the same location as where the hot product is removed. Lord, in various patents, attempts to deal with the heat and seed generation problem by spreading out the gas injection, but sufficient gas to fully fluidize the bed must be injected at the bottom so there is a limit to what can be accomplished in this manner. Inevitably, the bottom temperature must be maintained above 800° C. to provide the needed crystallization and some seeds are lost to the product which is in turn contaminated with broken "seed beads." The combination of high temperature and high deposition gas concentration leads to rapid reactions, increased wall deposits and increased risk of agglomeration and plugging.

This multistage design approach also leads to tall reactors and there are cost and manufacturability issues in producing the high purity liners for such reactors which restrict the number of stages and hence production capacity of a given diameter reactor. It is also necessary to measure the bed level and take corrective action by removing some of the bed as the bed grows by opening valves and changing purge flows to allow the right amount of beads to leave the bed. Errors or stuck valves can lead to situations where the bed is too high or too low. Both of these conditions are undesirable.

BRIEF SUMMARY OF THE INVENTION

A primary object of the invention is to provide a shorter reactor with greater silicon production capability.

Another object of the invention is to provide a passive method of level control.

Another object of the invention is to provide a better quality product.

A further object of the invention is to reduce the need for high temperature at the bottom of the reactor.

Yet another object of the invention is to reduce the risk of plugging.

Still yet another object of the invention is to reduce the thickness of wall deposits.

Another object of the invention is to reduce the pressure in the product removal system.

Another object of the invention is to recover energy.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed an apparatus and method for top removal of granular material from a fluidized bed deposition reactor comprising removal of the product from the top of the reactor together with the effluent gas, separation of the granular product from the effluent gas, simultaneous recovery of heat from the product and the gas and optional further dust and heat recovery.

The technical benefits of the disclosed design include, but are not limited to, passive level control, decreased disengaging height, a taller fluidized bed in a shorter reactor, separation of gas inlet from product outlet, separation of product grinding from product outlet and energy recovery which in turn leads to lower capital and operating cost, a better quality product and greater throughput for a given reactor diameter.

BRIEF DESCRIPTION OF THE DRAWINGS

The drawings constitute a part of this specification and include exemplary embodiments of the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENT

Detailed descriptions of the preferred embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
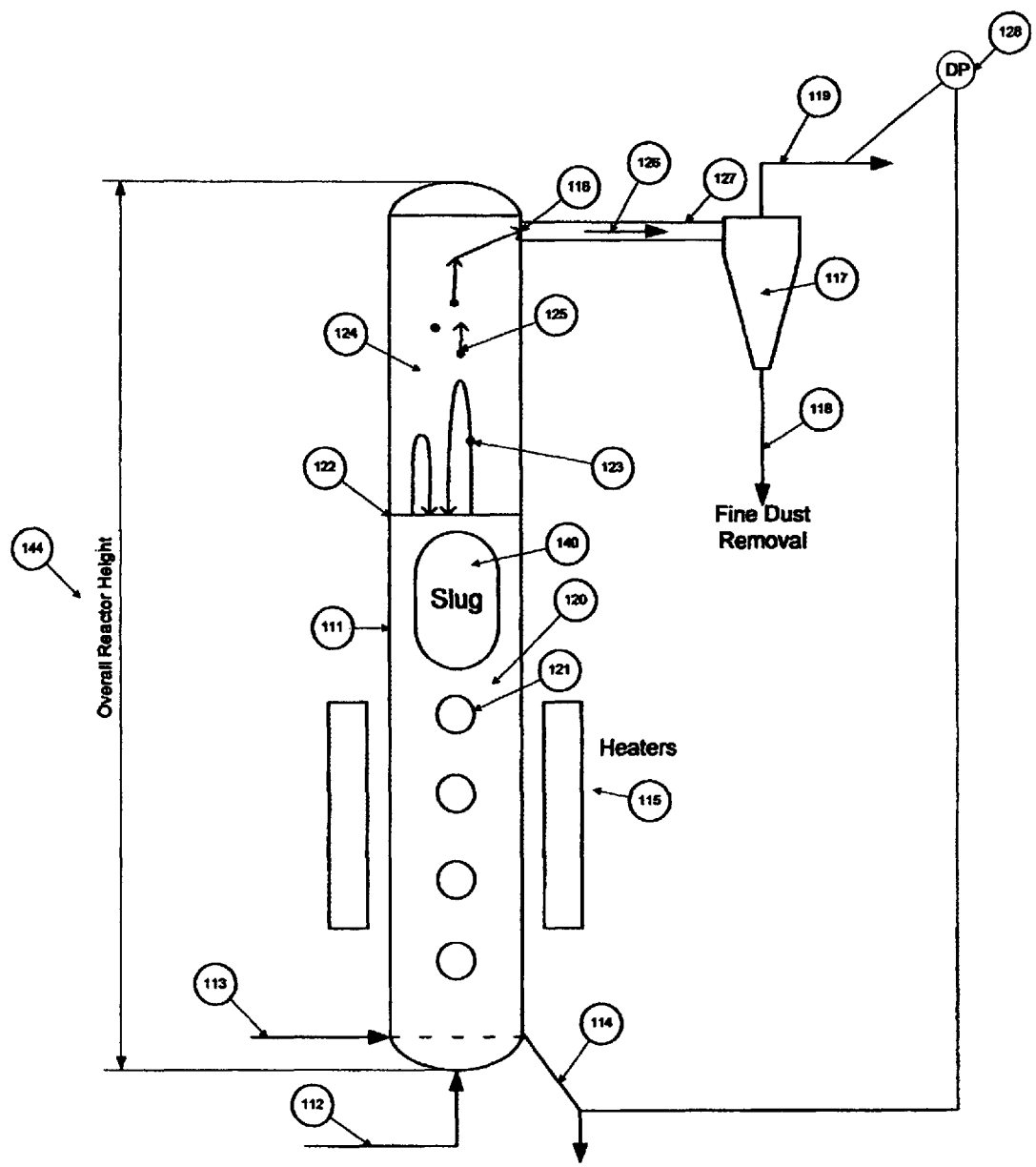
FIG. 1 is a schematic cross sectional diagram illustrating the operation of a fluidized bed deposition reactor of the prior art with bottom removal and a large disengaging space.

FIG. 1 is a schematic diagram of a typical fluidized bed deposition reactor comprising a containment vessel or liner 111 of a height 144, a gas introduction means 112, an optional gas distribution means 113, a bottom product removal means 114, a bed heating means 115, a gas/dust mixture exit 116, a connecting means 127, a dust/gas separation means 117, a dust removal means 118 and a gas exit 119. The containment vessel 111 surrounds a bed of granules 120 which are fluidized by gas bubbles 121 to have an average top level 122 above which product granules 123, thrown up above the bed, describe arcs as they rise from random impact within the bed and then fall under gravity in a reduced disengaging space 124 while the small entrained dust particles 125 continue up and leave with the effluent gas 126 through the gas/dust mixture exit 116 into and through the connecting means 127 entering the dust/gas separation means 117. Most of the dust 125 is removed from the gas 126 in the dust/gas separation means 117 and then ultimately leaves the system via the dust removal means 118 while the gas 126 and residual dust leaves via an exit 119. The differential pressure meter 128 measures the difference in pressure between the bottom product removal means 114 and the gas exit 119. This measurement indicates the level 122 of the bed of granules 120. The bottom removal means 114, is used to control the top level 122 to maintain the disengaging space 124 so that the product granules 123 are returned to the bed of granules 120 and are thus removed by the bottom product removal means 114. FIG. 1 is a general schematic; the patent literature is full of the various methods and machines that have been proposed to fulfill these requirements. It is possible to have more than one gas entry and to avoid the gas distribution mechanism, the heating means can be of many different kinds, and the dust removal can be accomplished by use of a cyclone, as shown, by a filter or by another gas cleaning device.

Figure 2:
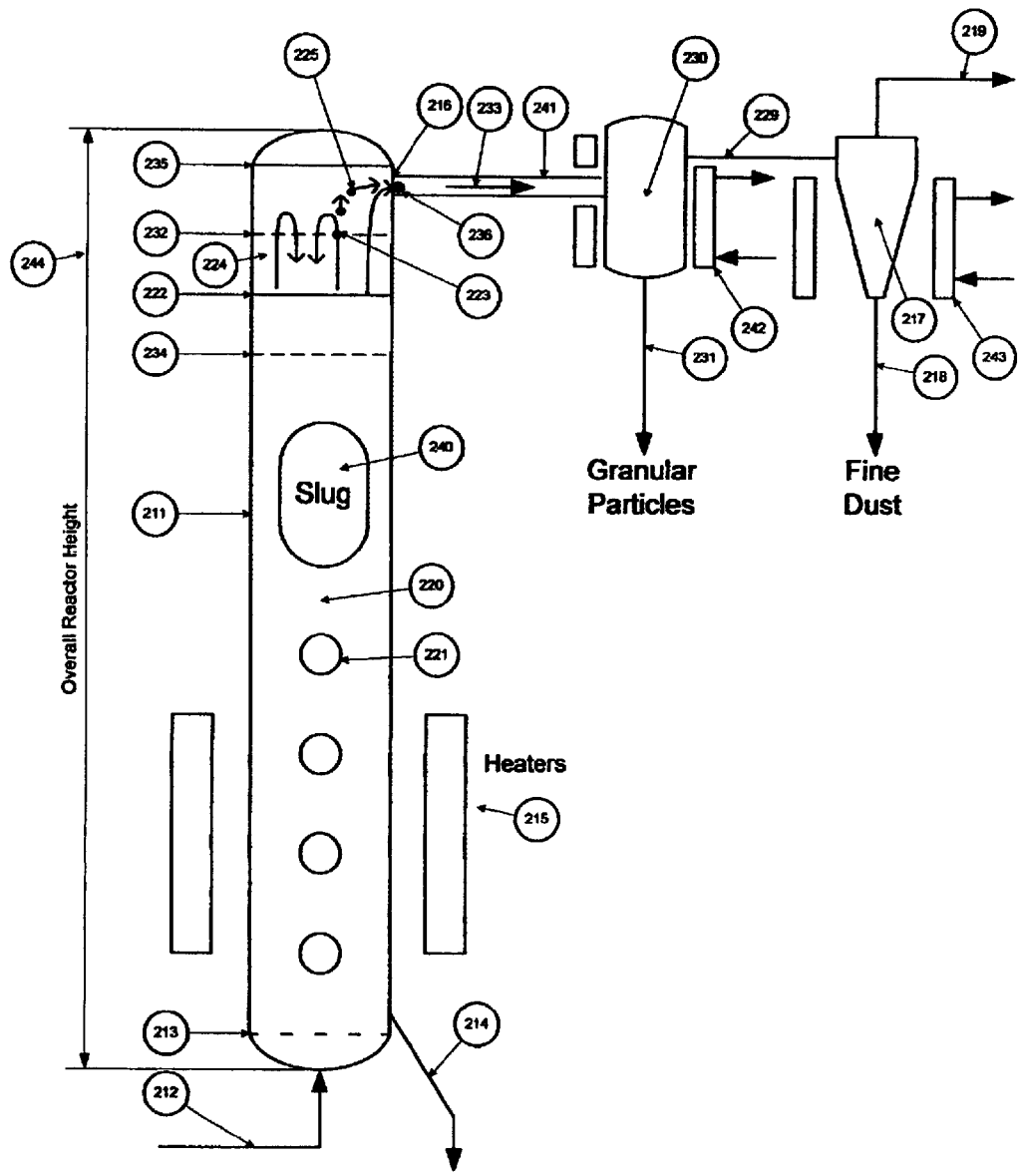
FIG. 2 shows FIG. 1 modified to incorporate features of the invention.

FIG. 2 shows a schematic of a fluidized deposition reactor similar to FIG. 1 incorporating features of the invention. In particular, FIG. 1, which uses a bottom removal of the granular product, is modified to remove the granular product from the top via a gas/granular separator means 230 inserted before the effluent gas enters the gas/dust separation means 217. A further modification is the removal of the differential pressure transmitter 128, shown in FIG. 1, which is not required for bed level control. The reactor of FIG. 2 thus comprises a containment vessel or liner 211 of a height 244, a gas introduction means 212, an optional gas distribution means 213, an optional bottom product removal means 214, a bed heating means 215, a gas/dust/granular mixture exit 216, a first connecting means 241, a gas/granular separator means 230 with a granular removal means 231, an optional heat recovery means 242, a further connecting means 229, a gas/dust separation means 217, a further optional heat recovery means 243, a dust removal means 218, and a gas exit 219. The containment vessel 211 surrounds a bed of granules 220 fluidized by gas bubbles 221 and gas slugs 240. The reactor has an average top level 222 above which some granules 223, thrown up above the bed, describe arcs as they rise from random impact within the bed and then fall under gravity in a reduced disengaging space 224 while some granules 236 and the small entrained dust particles 225 continue up and leave with the effluent gas 233, through the gas/dust/granular mixture exit 216, the connecting means 241 and into the gas/granular separator means 230, where the granules are removed via the granular removal means 231. The remaining gas and dust leave through the gas/dust top exit tube 229, then enter the gas/dust separation means 217, where most of the dust 225 is removed from the gas 233, and ultimately leaves the system via the dust removal means 218 while the gas 233 and residual dust leaves via an exit 219.

To accomplish the removal of large granules the average top level 222 is very close to the gas/dust/granular mixture exit 216 and consequently some of the product granules 236 thrown up above the bed do not describe arcs as they rise then fall under gravity in the disengaging space 224, but continue with the entrained dust 225 out the gas/dust/granular mixture exit 216. Since the average bed level 222 is closer to the exit 216 the bed level 222, can be taller and/or the overall height 244 can be shorter compared to the prior art such as shown in FIG. 1.

Figure 3:
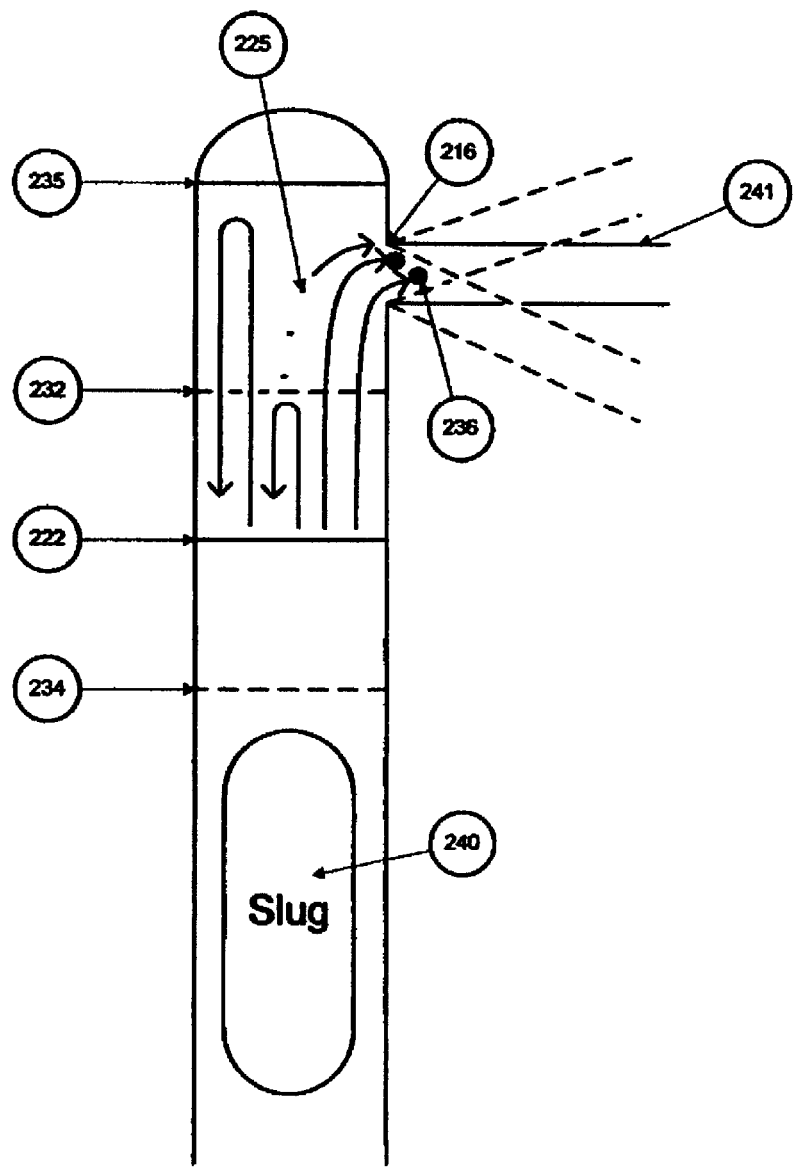
FIG. 3 is a detailed schematic cross sectional diagram of the top of the reactor of FIG. 2 showing the granular particle removal mechanism.

FIG. 3, shows in detail the various mechanisms which cause the product granules 236 to be carried out the gas exit 216. The basic mechanism is the random ejection of product granules 236 from the top of the bed 222 and the pneumatic conveying of these granules out the gas/dust/granular exit 216. In addition, the bed level oscillates up and down due to the formation of gas slugs 240, which lift sections of the bed up to the high level 232, until they break through and the bed level recedes to the low level 234. It is also possible for the bed to reach extra high levels 235, where the bed is briefly above the exit 216. The exit tube 241 can be attached to the exit 216 at a 90° angle, as shown, or sloped above or below the horizontal. The angle chosen can be determined by the application of standard pneumatic conveying calculations using the gas velocity in the exit tube 241. While FIG. 3 shows an exit 216 in the side of the reactor, it can be anywhere in the top portion and in fact can provide for removal vertically at the top of the reactor.

Figure 4:
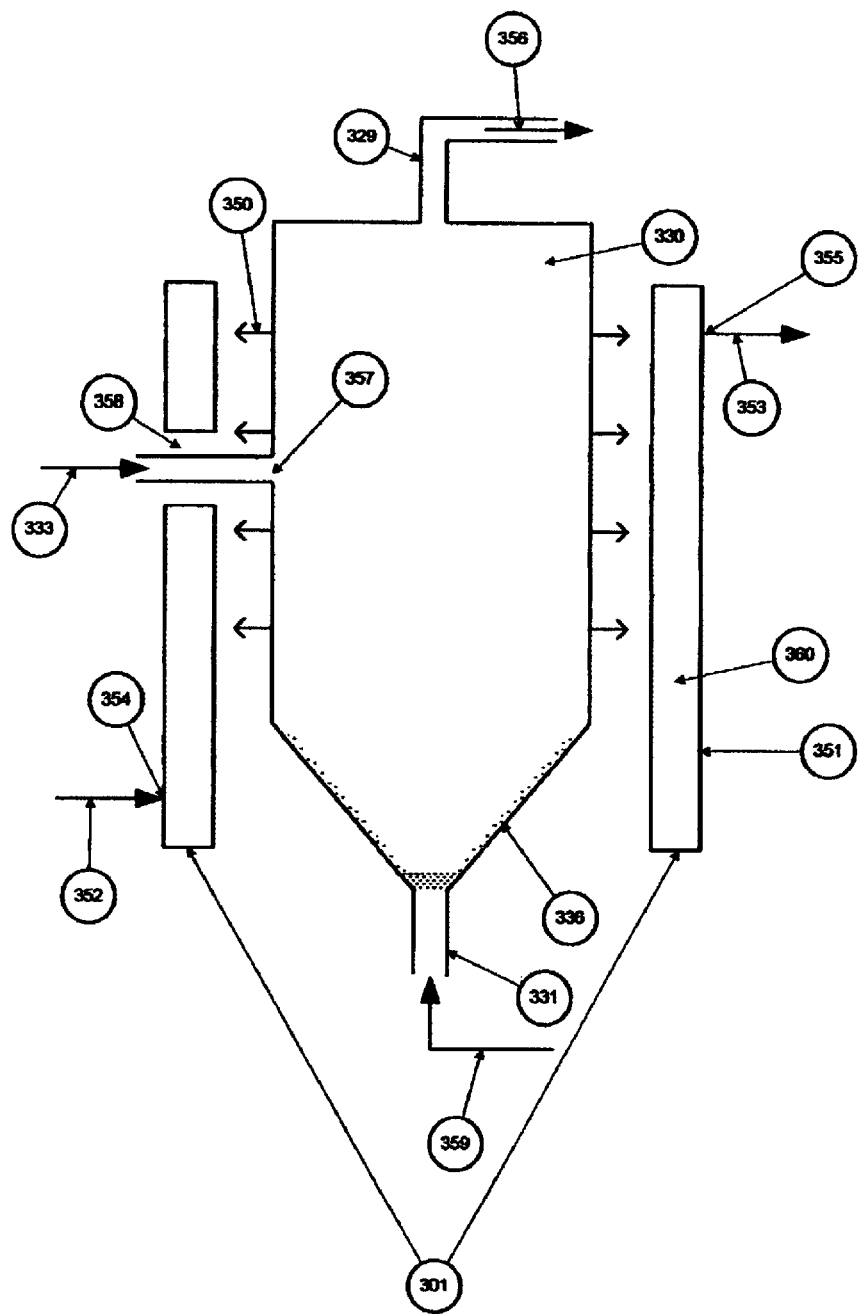
FIG. 4 is a schematic cross sectional drawing of a product separator with integrated heat recovery.
Figure 5:
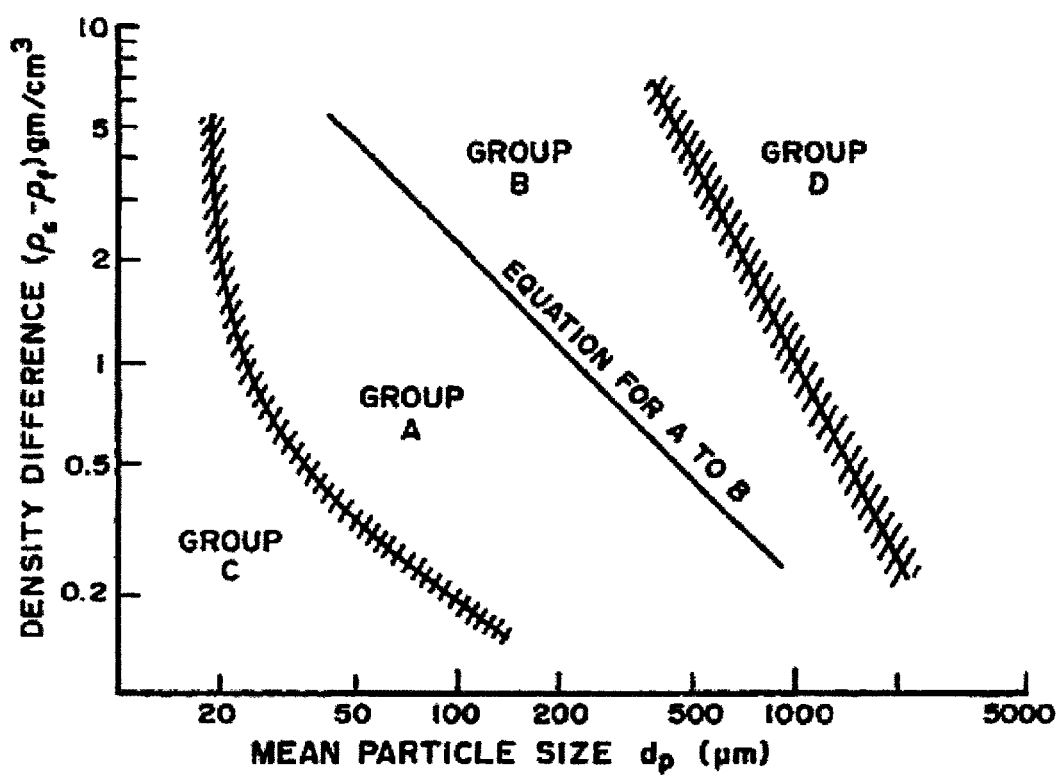
FIG. 5 is a graph showing the regions of the four Geldart classifications as shown in FIG. 5.3, Page 103 of *Multiphase Flow And Fluidization*, by D. Gidaspow.

FIG. 4 shows a more detailed schematic of a product separator 330 with an integrated heat recovery system 301 suitable for high temperature and high purity applications. The gas/dust/granular mixture 333 enters the product separator 330 through an inlet 357 which extends via a penetration 358 through the heat recovery system 301; the gas and dust 356 then exit through the top via the exit tube 329 while the granules 336 separate and fall to the bottom exit 331, where it is fluidized by a purge stream 359 and withdrawn as needed.

The heat recovery system 301 is comprised of a heat transfer fluid 360, contained in a container 351 which surrounds the product separator 330 and is shaped to capture heat 350 from the wall of the product separator 330. The heat recovery system has an inlet 354 and an outlet 355 for adding and removing the heat transfer fluid 360. The container 351 can use various heat transfer fluids 360 such as water or hot oil. It is usually advantageous for the container 351 to be a pressure vessel to permit heat recovery at higher temperatures. The heat may be transferred from the wall of the product separator 330 to the container 351 by radiation, conduction or convection and well-known heat transfer techniques can be used to enhance the heat transfer from the gas and solids to the wall. Similarly, well-known gas-solids removal techniques, such as cyclones or filters, can be used to enhance the gas-solids separation.

In a particularly advantageous design the heat is transferred by radiation from the hot surface of the product separator 330 to a pressurized container 351 containing water 352 fed in through the inlet 354, the water 352 being converted to steam 353 by the heat transferred to it, the resultant steam leaving through the exit 355.

As an example, referring to FIG. 2 the diameter of the container or liner 211 is 300 mm, the overall height 244 of the liner 211 is 7 meters, the average bed level 222 is 6 meters, the high level is about 6.6 meters and the low level is about 5.4 meters. A gas, such as silicon tetrachloride ($SiCl_4$), nitrogen ($N_2$) or another gas non-reactive in the system, is fed to the bottom of the container 211. The superficial velocity at the top of the container 211 is about 4.7 ft/s (1.4 m/s). The bed granules 220 which are then introduced into the container 211 preferably comprise particles which are greater in size and density than particles referred to as Geldart C particles. The average particle size of the granules is 1 mm and the terminal velocity is 21.8 ft/s (6.56 m/s). The particle terminal velocity is thus about 4 times the superficial gas velocity. This means that in order to carry the granules out of the reactor, the local velocity in areas just above the bed must have local surges that are 4 times higher than average. Velocity surges of this magnitude occur close to the top of the bed at about 20 cm above the bed. The slug 240 has a maximum length of about 1.2 meter so that the periodic growth and bursting of the slug provides the variation in height of 1.2 meters between low and high level. As the slug bursts, it also accelerates the granular particles which are then entrained out of the reactor. Thus the granular removal varies with the pulsing of the slugs 240.

In comparison, a prior art system such as shown in FIG. 1 under similar operating conditions with an average bed level 122 of 6 meters would have an overall height of about 10 meters in order to allow for the disengaging space normally required under the prior art. Once the fluidized bed is established the reactor gas, such as trichlorosilane ($HSiCl_3$) or other silane gases, are added, the quantity of fluidizing gas being proportionally reduced to maintain flow and fluidized bed stability.

The granules and gas at the bottom of the reactor which have a temperature of 700° C., are then heated so that they leave the reactor as stream 233 via exit 216, at a temperature of about 800° C. They enter the cyclonic product separator 230 through a tangential inlet which forces the gas and solids to the wall of the vessel to improve gas to wall heat transfer. The diameter of the cyclone is 10 inches (250 mm) and the length is 6 ft (1.8 m). This is longer than needed solely for solids removal in order to provide sufficient surface area for heat transfer. The gas and granules both leave at 600° C. The dust/gas separator 217 is of a similar size but only removes about half the heat because of the reduced temperature difference. The gas and dust then leave the dust/gas separator at 500° C. Both heat recovery systems recover the heat as 150 psig steam, which is a standard utility useful in the facility for a variety of purposes and thus is always in demand.

This procedure provides a reactor for top removal of granular material. The generally cylindrical vertical reactor has a fluidized bed in a heated reaction zone. Fluidization is initially provided by the inert gas and then a mixture of the innert gas and the reaction gas The bed is fluidized to establish a bubbling fluidized bed with a defined stable height. A disengaging space is established above the top of the fluidized bed, the height of said disengaging space being no greater than the distance between the top of the bubbling bed and the gas and solids outlet of the container. The reaction gas is provided to the reaction zone while adjusting the flow rate of the fluidizing gas so that a majority of the granular particles are retained in the container while bubbling is maintained. The reaction gas deposits a coating of a reaction product (polycrystaline silicon) on the granular particles, thus increasing the size and weight of the particles. However, as a result of abrasion between the coated particles in the fluidized bed the silicon is abraded off and becomes entrained in the flowing gas stream. The height of the bed is allowed to increase and the disengaging height to decrease until the bursting of bubbles near the surface of the bed periodically throw granular particles out of the gas and solids outlet of the container, along the conduit and into the gas and granular product separator, a portion of which is the silicon reacton product. The flow rates of the fluidizing gas and the reaction gas are controlled so as to establish a stable height of the bed where the average rate of solid material exiting out of the gas and solids outlet equals the average increase in weight of the granular particles in the bed to establish a stable reaction process along with recovery and recycle of reaction bed particles (if transported through the top exit) and recovery of the polycrystaline end product.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

I claim:

1. A method of operation of a fluidized bed deposition reactor for top removal of granular material comprising:
    providing a vertical generally cylindrical reactor of a predetermined height, said reactor having at least one gas inlet at or near the bottom thereof and at least one gas and solids outlet at or near the top thereof,
    providing at least one separator to separate gas from granular product and a conduit between the gas and solids outlet and said at least one separator,
    establishing a heated reaction zone;
    providing a fluidizing gas to the reaction zone at a predetermined flow rate,
    providing granular Geldart A, B, or D particles to the reaction zone to establish the desired fluidized bed, said particles having a variable fluidized height, the bed being fluidized to establish a bubbling fluidized bed with a top of a defined stable height, a disengaging space being provided above said top, the height of said disengaging space being no greater than the distance between the defined top of the bubbling bed and the gas and solids outlet of the container,
    providing a reaction gas to the reaction zone while adjusting the flow rate of the fluidizing gas so that a majority of the granular particles are retained in the reactor while maintaining bubbling, the reaction gas depositing a coating on said granular particles, thus increasing the size and weight of the particles resulting in an increase in the height of the bed, and
    allowing the height of the bed to increase and the disengaging height to decrease until the bursting of bubbles near the surface of the bed periodically throws granular particles out of the gas and solids outlet at the top of the reactor, along the conduit and into the gas and granular product separator,
    wherein the flow rates of the fluidizing gas and the reaction gas is controlled so as to establish a stable height of the bed where the average rate of granular particles exiting out of the gas and solids outlet is substantially equal to the average increase in weight of the particles.

2. The method of claim 1 further including recovery of heat while separating the granular product from the gas comprising using one or more product separators in combination with one or more heat recovery systems.

3. The method of claim 1 wherein the fluidized bed deposition reactor is also configured to allow granular product removal at the bottom of the reactor.

4. The method of claim 2 wherein at least one of the heat recovery means is by radiation to a heat recovery boiler.

5. The method of claim 2 wherein at least one separator provides one or more product streams comprising particles of different average particle size.

* * * * *